(12) United States Patent
Bland et al.

(10) Patent No.: US 8,086,722 B2
(45) Date of Patent: Dec. 27, 2011

(54) TECHNIQUES FOR MEASURING PEER-TO-PEER (P2P) NETWORKS

(75) Inventors: William Bland, Mountain View, CA (US); James Edward Moore, Hadleigh (GB)

(73) Assignee: Rovi Solutions Corporation, Santa Clara, CA (US)

( * ) Notice: Subject to any disclaimer, the term of this patent is extended or adjusted under 35 U.S.C. 154(b) by 1031 days.

(21) Appl. No.: 11/315,107

(22) Filed: Dec. 21, 2005

(65) Prior Publication Data

US 2007/0143405 A1    Jun. 21, 2007

(51) Int. Cl.
*G06F 15/173* (2006.01)
(52) U.S. Cl. ....................................................... 709/224
(58) Field of Classification Search .......... 709/223–226; 705/14.49; 726/22–24
See application file for complete search history.

(56) References Cited

U.S. PATENT DOCUMENTS

| | | | |
|---|---|---|---|
| 4,790,017 A | 12/1988 | Hinton | |
| 5,437,050 A | 7/1995 | Lamb et al. | |
| 5,708,759 A | 1/1998 | Kemeny | |
| 5,848,396 A * | 12/1998 | Gerace | 705/10 |
| 5,914,714 A | 6/1999 | Brown | |
| 5,918,223 A | 6/1999 | Blum et al. | |
| 5,925,843 A | 7/1999 | Miller et al. | |
| 5,956,671 A | 9/1999 | Ittycheriah et al. | |
| 5,978,791 A | 11/1999 | Farber et al. | |
| 6,188,010 B1 | 2/2001 | Iwamura | |
| 6,415,280 B1 | 7/2002 | Farber et al. | |
| 6,502,125 B1 | 12/2002 | Kenner et al. | |
| 6,553,403 B1 | 4/2003 | Jarriel et al. | |
| 6,625,643 B1 | 9/2003 | Colby et al. | |
| 6,665,726 B1 | 12/2003 | Leighton et al. | |
| 6,678,680 B1 | 1/2004 | Woo | |
| 6,708,212 B2 * | 3/2004 | Porras et al. | 709/224 |
| 6,732,180 B1 | 5/2004 | Hale et al. | |
| 6,799,221 B1 | 9/2004 | Kenner et al. | |
| 6,826,546 B1 | 11/2004 | Shuster | |
| 6,892,227 B1 * | 5/2005 | Elwell et al. | 709/218 |
| 6,947,386 B2 | 9/2005 | Temudo de Castro et al. | |
| 6,981,180 B1 | 12/2005 | Bailey et al. | |
| 7,020,701 B1 | 3/2006 | Gelvin et al. | |
| 7,100,199 B2 | 8/2006 | Ginter et al. | |
| 7,111,061 B2 | 9/2006 | Leighton et al. | |
| 7,120,800 B2 | 10/2006 | Ginter et al. | |

(Continued)

FOREIGN PATENT DOCUMENTS

FR      2816417 A1      10/2002

(Continued)

OTHER PUBLICATIONS

Stakhanova, N.; Basu, S.; WOng, J.; Stakanov, O., Trust Framework for P2P Networks using Peer-Profile based Anomaly Technique, Jun. 6-10, 2005, Dept. of Computer Science, Iowa State University, ICDCSW'05, IEEE, pp. 1-7.*

(Continued)

*Primary Examiner* — Chirag Patel
(74) *Attorney, Agent, or Firm* — Schwegman, Lundberg & Woessner, P.A.

(57) ABSTRACT

Techniques for measuring Peer-To-Peer (P2P) networks are provided. P2P are initially seeded with links to feigned content. As a P2P participant accesses a link metrics are recorded about the P2P network being used by the participant. The metrics are used to form measurements to compare different P2P networks relative to one another.

20 Claims, 3 Drawing Sheets

U.S. PATENT DOCUMENTS

| | | | |
|---|---|---|---|
| 7,136,922 | B2 | 11/2006 | Sundaram et al. |
| 7,143,170 | B2 | 11/2006 | Swildens et al. |
| 7,155,723 | B2 | 12/2006 | Swildens et al. |
| 7,185,052 | B2 | 2/2007 | Day |
| 7,194,522 | B1 | 3/2007 | Swildens et al. |
| 7,203,753 | B2 | 4/2007 | Yeager et al. |
| 7,313,619 | B2 | 12/2007 | Torrant et al. |
| 7,356,487 | B2 | 4/2008 | Kitze |
| 7,363,278 | B2 | 4/2008 | Schmelzer et al. |
| 7,376,749 | B2* | 5/2008 | Loach et al. ............. 709/238 |
| 7,409,644 | B2 | 8/2008 | Moore et al. |
| 7,490,149 | B2* | 2/2009 | Omote et al. ............ 709/224 |
| 2001/0037314 | A1 | 11/2001 | Ishikawa |
| 2002/0065880 | A1 | 5/2002 | Hasegawa et al. |
| 2002/0082999 | A1 | 6/2002 | Lee et al. |
| 2002/0083060 | A1 | 6/2002 | Wang et al. |
| 2002/0087885 | A1 | 7/2002 | Peled et al. |
| 2002/0099955 | A1 | 7/2002 | Peled et al. |
| 2002/0120859 | A1 | 8/2002 | Lipkin et al. |
| 2002/0141387 | A1 | 10/2002 | Orshan |
| 2002/0143894 | A1 | 10/2002 | Takayama |
| 2002/0152173 | A1 | 10/2002 | Rudd |
| 2002/0152261 | A1 | 10/2002 | Arkin et al. |
| 2002/0152262 | A1 | 10/2002 | Arkin et al. |
| 2002/0174216 | A1 | 11/2002 | Shorey et al. |
| 2002/0194108 | A1 | 12/2002 | Kitze |
| 2003/0023421 | A1 | 1/2003 | Finn et al. |
| 2003/0028889 | A1 | 2/2003 | McCoskey et al. |
| 2003/0056118 | A1 | 3/2003 | Troyansky et al. |
| 2003/0061287 | A1 | 3/2003 | Yu et al. |
| 2003/0061490 | A1 | 3/2003 | Abajian |
| 2003/0070070 | A1 | 4/2003 | Yeager et al. |
| 2003/0093794 | A1 | 5/2003 | Thomas et al. |
| 2003/0095660 | A1 | 5/2003 | Lee et al. |
| 2003/0097299 | A1 | 5/2003 | O'Kane et al. |
| 2003/0130953 | A1 | 7/2003 | Narasimhan et al. |
| 2003/0135548 | A1* | 7/2003 | Bushkin ................. 709/203 |
| 2003/0195852 | A1 | 10/2003 | Campbell et al. |
| 2003/0233541 | A1 | 12/2003 | Fowler et al. |
| 2003/0236787 | A1 | 12/2003 | Burges |
| 2004/0010417 | A1 | 1/2004 | Peled |
| 2004/0030691 | A1 | 2/2004 | Woo |
| 2004/0030743 | A1 | 2/2004 | Hugly et al. |
| 2004/0031038 | A1 | 2/2004 | Hugly et al. |
| 2004/0093354 | A1 | 5/2004 | Xu et al. |
| 2004/0103280 | A1 | 5/2004 | Balfanz et al. |
| 2004/0107215 | A1 | 6/2004 | Moore et al. |
| 2004/0111604 | A1 | 6/2004 | Fournier |
| 2004/0139329 | A1 | 7/2004 | Abdallah et al. |
| 2004/0158546 | A1 | 8/2004 | Sobel et al. |
| 2004/0181688 | A1 | 9/2004 | Wittkotter |
| 2005/0075119 | A1 | 4/2005 | Sheha et al. |
| 2005/0089014 | A1 | 4/2005 | Levin et al. |
| 2005/0091167 | A1 | 4/2005 | Moore et al. |
| 2005/0105476 | A1* | 5/2005 | Gotesdyner et al. ......... 370/254 |
| 2005/0108378 | A1 | 5/2005 | Patterson et al. |
| 2005/0114709 | A1 | 5/2005 | Moore |
| 2005/0147044 | A1 | 7/2005 | Teodosiu et al. |
| 2005/0154681 | A1 | 7/2005 | Schmelzer |
| 2005/0198317 | A1 | 9/2005 | Byers |
| 2005/0198535 | A1 | 9/2005 | Basche et al. |
| 2005/0203851 | A1 | 9/2005 | King et al. |
| 2005/0216433 | A1 | 9/2005 | Bland et al. |
| 2005/0265367 | A1 | 12/2005 | Teodosiu et al. |
| 2005/0267945 | A1* | 12/2005 | Cohen et al. ............... 709/215 |
| 2006/0015936 | A1 | 1/2006 | Illowsky et al. |
| 2006/0149806 | A1 | 7/2006 | Scott et al. |
| 2007/0074019 | A1 | 3/2007 | Seidel |

FOREIGN PATENT DOCUMENTS

| | | |
|---|---|---|
| JP | 2000322080 A | 11/2000 |
| WO | WO-0111496 | 2/2001 |
| WO | WO-0150354 A1 | 7/2001 |
| WO | WO-0177775 | 10/2001 |
| WO | WO-02075595 | 9/2002 |
| WO | WO-02077847 | 10/2002 |
| WO | WO-02082271 | 10/2002 |
| WO | WO-2005006157 A1 | 1/2005 |
| WO | WO-2005043359 | 5/2005 |
| WO | WO-2005043819 | 5/2005 |
| WO | WO-2005046174 | 5/2005 |
| WO | WO-2005084252 | 9/2005 |
| WO | WO-2005109179 | 11/2005 |
| WO | WO-2006041742 | 4/2006 |
| WO | WO-2006086158 | 8/2006 |

OTHER PUBLICATIONS

Vishnumurthy, Vivek, et al., "Karma: A Securie Economic Framework for Peer-to-Peer Resource Sharing", (2003), 6 pgs.

"PCT Search Report for PCT/GB02/01347", (Aug. 21, 2002),2 pgs.

"PCT Search Report for PCT/US2004/029798", (Dec. 21, 2004),2 pgs.

"PCT Search Report for PCT/US2004/029869", (Feb. 22, 2005),2 pgs.

"PCT Search Report from PCT/US05/15643", (Jan. 13, 2006),1 pg.

"PCT Search Report from PCT/US2004/029685", (Apr. 27, 2005),3 pgs.

Chawathe, Yatin, et al., "Making Gnutella-Like P2P Systems Scalable", *SIGCOMM '03*, 'Online!, Aug. 25, 2003, XP002315870, Karlsruhe, Germany, Retrieved for the Internet: URL: http//delivery.acm.org/, on Jan. 31, 2005, Section 1: Introduction, (Aug. 2003).

Cuenca-Acuna, F M., et al., "Autonomous Replication for High Availability in Unstructured P2P Systems, Reliable Distributed Systems", *Proceedings. 22nd International Symposium on Oct. 6-8, 2003*, Piscataway, NJ, USA, *IEEE*, (Oct. 2003),99-108.

Dias, D, et al., "A scalable and highly available web server", In *Proceedings of the IEEE Computer Conference (COMPCON)*, Santa Clara, (Mar. 1996).

Lee, C Y., "Application of a cross decomposition algorithm to a location and allocation problem in distributed systems", *Computer Communications*, Elsevier Science Publishers BV, Amsterdam, NL, 18(5), (May 1995),367-377.

Lichtman, D, et al., "Anonymity a Double-Edged Sword for Pirates Online", *The Chicago Tribune*, (Apr. 13, 2000),2 pgs.

Neild, L., et al., "Investigating peer-to-peer systems for resource sharing within a small group of nodes", *Information Technology: Coding and Computing, 2004 Proceedings. ITCC 2004*. International Conference on Las Vegas, NV, USA Apr. 5-7. 2004. Piscataway, NJ, USA, *IEEE*, vol. 2, Apr. 5, 2004, 400-404.

Oliveira, L B., et al., "Evaluation of ad-hoc routing protocols under a peer-to-peer application", *Wireless Communications and Networking, 2003. WCNC 2003.* 2003 IEEE Mar. 16-20, 2003, Piscataway, NJ, (Mar. 16, 2003),1143-1148.

Ozumutlu, S, et al., "A day in the life of Web searching : an exploratory study", *Information processing & Management*, Elsevier, Barking, GB, vol. 40, No. 2, (Mar. 2004),319-345.

Pastor, L, et al., "An efficiency and scalability model for heterogeneous clusters", *42nd Annual Symposium on Foundations of Computer Science. (FOCS 2001)*. Las Vegas, Oct. 14-17. 2001. *Annual Symposium on Foundations of Computer Science*, Los Alamitos, CA : IEEE Comp. Soc. US, Oct. 8, 2001,427-434.

Schroeder, T, "Scalable Web Server Clustering Technologies", *IEEE Network* May/Jun. 2000,3845.

Ito, Mabo R., et al., "Zero-Crossing Measurements for Analysis and Recognition of Speech Sounds", *IEEE Transactions on Audio and Electroacoustics* vol. AU-19, No. 3, (Sep. 1971),8 pgs.

Cuenca-Acuna, Francisco Matias, et al., "Autonomous Replication for High Availability in Unstructured P2P Systems", *Technical Report DCS-TR-509*, Department of Computer Science, Rutgers University, (Apr. 24, 2003), 21 pgs.

"VPN—Virtual private Networking, an overview,", [Online]. Retrieved from Internet: <URL: http://web.archive.org/web/20020124162522/http://homenethelp.com/vpn/>, (Jan. 24, 2002), 2 pgs.

Barb, Dijker, "Re: [Sage] IP Assignment Map???", [Online]. Retrieved from the Internet: <URL: http://www.sage.org/lists/sage-members-archive/2001/msg01063.html>, (Aug. 20, 2001), 2 pgs.

Hubbard, K, "Internet Registry IP Allocation Guidelines", [Online]. Retrieved from the Internet: <URL: http://www.ietf.org/rfc/rfc2050.txt?number=2050>, (Nov. 1996), 13 pgs.

Kedem, Bengamin, "Spectral Analysis and Discrimination by Zero-Crossings", *Proceedings of the IEEE, IEEE*, New York, NY, U.S.A., vol. 74, No. 11, (Nov. 1986), 1477-1493.

Ooghe, Sven, et al., "Impact of the Evolution of the Metropolitan Network on the DSL Access Architecture", *IEEE Communications Magazine*, (Feb. 2003), 140-145.

Parlante, Nick, "IP Routing, Handout #5", Stanford, (Spring 01-02), 6 pgs.

Passarge, Elke, "Layer 4 switching : The magic combination", *Network World*, [Online]. Retrieved from the Internet: <URL: http://www.networkworld.com/newsletters/lans/0215lan1.html>, (Feb. 15, 1999), 3pgs.

Rybczynski, Tony, "Nortel : Layer 4 switching is an illusion", *Network World*, [Online]. Retrieved from the Internet: <URL: http://www.networkworld.com/forum/0208layer4no.html>, (Feb. 8, 1999), 3 pgs.

Saunders, John, "Real-Time Discrimination of Broadcast Speech/Music", [*IEEE International Conference on Acoustics, Speech, and Signal Processing—Proceedings. (ICASSP)*], vol. 2, 7, (May 1996), 993-996.

Smith, Gavin, et al., "Quick Audio Retrieval Using Active Search", *Proc. of 1998 IEEE ICASSP* vol. 6, (May 12, 1998), 3777-3780.

Socolofsky, T, et al., "Request for Comments : 1180, A TCP/IP Tutorial", [Online]. Retrieved from Internet: <URL: http://tools.ietf.org/html/rfc1180>, (Jan. 1991), 28 pgs.

"European Application Serial No. 05723934, European Search Report mailed Nov. 8, 2010", 1 pg.

\* cited by examiner

TECHNIQUES FOR MEASURING PEER-TO-PEER (P2P) NETWORKS

FIELD

The invention relates generally to data processing and more specifically for techniques for measuring Peer-To-Peer (P2P) Networks.

BACKGROUND

Peer-to-Peer (P2P) networks are virtual communities on the Internet where participants directly connect with one another or where they use an intermediate service to directly connect with one another. P2P has been the subject of much public debate and concern, since it provides participants the ability to share files and information with the potential of being undetected in the process.

The primary concern comes from content owners that distribute music, movies, literary works, etc. One of the more recent and high profile incidents occurred when Napster® was essentially stopped from distributing music over its P2P services for free. After this highly publicized case, many P2P networks have put checks and balances in place and have partnered with content owners to distribute copyrighted content for nominal fees. Although some abuses still remain within the P2P communities.

The entertainment industry has also realized that stopping P2P networks is not practical and in fact not presently a viable legal option. Moreover, even assuming P2P networks could be legally stopped, the publicity backlash could be devastating to the entertainment industry. As a result, content owners are trying to become active participants in P2P communities and trying to leverage the technology to their benefit for purposes of increasing sales and retaining customers.

Yet, little is known about P2P networks and even less is known about any given P2P network relative to another or remaining P2P networks. In most cases, the information about the characteristics for a given P2P network is only obtainable from the given P2P's provider, such as Napster®, Gnutella®, etc. The problem with this is that these providers may embellish their P2P's characteristics for purposes of appearing more significant than they actually are. But, quality information about P2P networks is vital to content owners and their business investment and marketing decisions.

Accordingly, improved techniques for measuring P2P networks are desirable.

SUMMARY

In various embodiments, techniques for distributing and monitoring content are presented. More specifically, and in an embodiment, a Peer-To-Peer (P2P) network measuring system is provided. The P2P network measuring system includes a P2P flooder, a P2P uploader, and a measuring service. The P2P flooder distributes links to content over a plurality of P2P networks. The P2P uploader records metrics from specific participants of the P2P networks when the participants attempt to acquire the content by accessing the links. The links point to the P2P uploader and the measuring service evaluates the metrics to develop measurements with respect to the P2P networks relative to one another.

DETAILED DESCRIPTION

Figure 1:
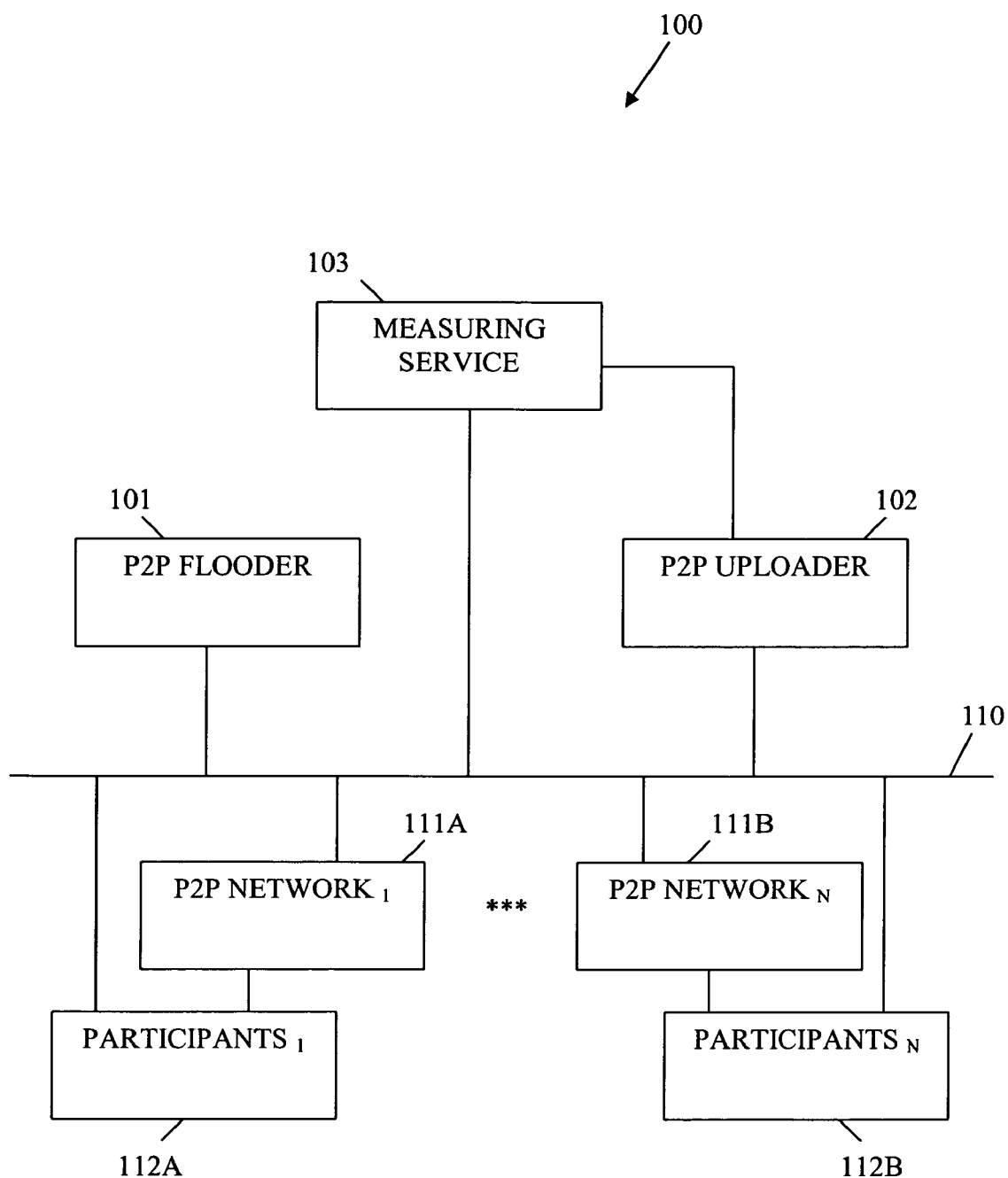
FIG. 1 is a diagram of a Peer-To-Peer (P2P) network measuring system, according to an example embodiment.

FIG. 1 is a diagram of a Peer-To-Peer (P2P) network measuring system 100, according to an example embodiment. The P2P network measuring system 100 is implemented in a machine accessible and readable medium and is accessible over a network 110. The network 110 may be wired, wireless, or a combination of wired and wireless.

The P2P network measuring system 100 includes a P2P flooder 101, a P2P uploader 102, and a measuring service 103. The components interact over a Wide Area Network (WAN) 110, such as the Internet, with a plurality of P2P networks 111A-111B and their participants 112A-112B, respectively. The P2P network measuring system 100 submits bogus links or references to content over the network 110 and when the participants 112A-112B attempt to access the link, metrics are gathered about the P2P networks 111A-111B and measurements are derived to draw some conclusions about each of the P2P networks 111A-111B relative to one another. Each of these components and their interactions will be discussed in turn.

The P2P flooder 101 is designed to distribute a reference to content to a variety of P2P networks 111A-111B. Distribution may occur in a variety of manners. For example, a sampling of known participants 112A-12B associated with the P2P networks 111A-111B may have the reference broadcast to them. Still further, the reference may be posted to known sites or bulletin boards associated with services that administer the P2P networks 111A-111B. In another case, the reference may be sent to all known participants 112A-112B without regarding to any sampling or seeding mechanism. In some embodiments, a combination of techniques may be used by the P2P flooder 101 to distribute the reference to the content.

The reference or link to the content identifies content that is determined to be universally of interest to the participants 112A-112B. For examples, Beatles music may be determined to have universal appeal. The reference pretends to be a link to the content, when in fact it is a link to the P2P uploader 102 and no content is actually available to the participants 112A-112B via the reference. The point of distributing the reference it to attract as much attention as possible from each of the participants 112A-112B who receives the reference. Surveys and other mechanisms such as revenue figures may be used to determine a piece of content that has a universal or popular appeal to a wide variety of users/participants 112A-112B.

The reference may even be accompanied with accompanying text or advertisements for attracting the participants 112A-112B to activate the reference/link for purposes of attempting to acquire the content. But, the content is not supplied to the participants 112A-112B; rather, when participants 112A-112B activate the reference/link believing that they will receive the content, they are in fact directed to the P2P uploader 102.

The P2P uploader 102 is designed to process activated references for the content. It is noted that the P2P uploader may actually be replicated and processed on the network 110 at a variety of locations in duplicate. That is, each P2P uploader may be processed to handle a particular P2P network 111A-111B or to process some subset of P2P networks 111A-111B.

The P2P uploader 102 performs a variety of metric gathering operations when it receives an activated reference from a participant 1112A-112B. When a participant 112A-112B attempts to download content by activating the reference, the P2P uploader 102 can detect the identity of the participant 112A-112B, perhaps the bandwidth connection of the access request, the P2P network 112A-112B from which the attempt is coming, the date and time of the attempt, the name of the content the participant 112A-112B was attempting to download, the identity of the P2P flooder 101, and a variety of other metrics.

The P2P uploader 102 communicates the metrics being gathered from the access attempts to the measuring service 103. The P2P uploader 102 will also notify the requesting participants 112A-112B over the network 110 that the content being requested is not available or that the download service is currently busy. In this way, the participants 112A-112B will not be aware of what the P2P uploader 102 is doing or that metrics were even being gathered with the request.

The measuring service 103 can use the metrics to generate a variety of measurements, conclusions, and/or reports about the content that the participants 112A-112B were attempting to download, about the participants 111A-111B, and about the P2P networks 111A-111B relative to one another.

For example, if the purported content was one associated with universal appeal, then the measuring service 103 may, after some predefined period of elapsed time, determine that one P2P network 111A or 111B is larger than that of another P2P network 111A or 111B. This can be done based on the number of attempted downloads that the P2P uploader 102 received from each of the two P2P networks 111A and 111B, such that the largest amount of downloads may be used to conclude a largest P2P networks 111A or 111B relative to the other P2P networks 111A or 111B.

In another example, responses gathered from participants 112A or 112B from one particular P2P networks 111A or 111B may be used to develop a profile. Thus, if the majority of participants 112A or 112B do not have broadband access or have less than another P2P network 111A or 111B, then conclusions or profiles may emerge. Such information may prove valuable to advertisers or to content providers, where a P2P network 111A or 111B with more broadband access may be more inclined to download large movie files than one with less broadband access.

In fact, other profiles that may be beneficial to the content owners or advertisers may also be derived from the metrics. For example, a general preference for a certain type of content, such as music may emerge for some P2P networks 111A or 111B whereas other networks 111A or 111B prefer movies. Preferences and profiles may also be derived about a specific participants 112A or 112B or about collections of participants 112A or 112B.

The measuring service 103 may also generate reports about specific types of contents that were associated with the references or links distributed by the P2P flooder 101. For instance, suppose a particular content provider wants to gauge the popularity of a movie release or attempt to identify the extent to which illegal download attempts are being made with a particular P2P network 111A or 111B or with respect to the groups or P2P networks 111A and 111B. These customized reports may be supplied to subscribing content owners.

Still further, the measuring service 103 may interface to an alerting or notification service or act as an alerting service itself. In this manner, content owners or advertisers may sign up for alerts, to identify when certain predefined thresholds are reached, such as one million download attempts for a particular piece of content.

Essentially, the P2P flooder 101 floods each P2P network 111A and 111B with spoof results for a particular piece of content. That content may be viewed as background in a sense that its popularity is roughly constant across the P2P networks 111A and 111B. The P2P flooder 101 is linked via the reference or link sent to the participants 112A and 112B back to the P2P uploader 102.

In some embodiments, the P2P flooder 101 may be intermediately linked to an application, such as a searcher, that ensures the proportion of results (access attempts) coming from each instance of the P2P flooder 101 is constant in time and across the P2P networks 111A and 111B.

In an embodiment, there may be multiple instances of the P2P flooders 101 and the P2P uploaders 102. The multiple instances cooperate with one another to distribute the feigned reference to the content and to gather the metrics from results or access attempts. The metrics gathered by the P2P uploaders 102 are centralized via the measuring service 103. The measuring service records the metrics and may be used to synthesize the metrics or mine the metrics to derive valuable statistical conclusions about the P2P networks 111A and 111B relative to one another.

It is now apparent how statistical and valuable information may be gathered about P2P networks 111A and 111B independent of P2P network enterprises. The techniques presented herein are more useful than traditional crawling techniques and are more efficient requiring less resources and processing.

Figure 2:
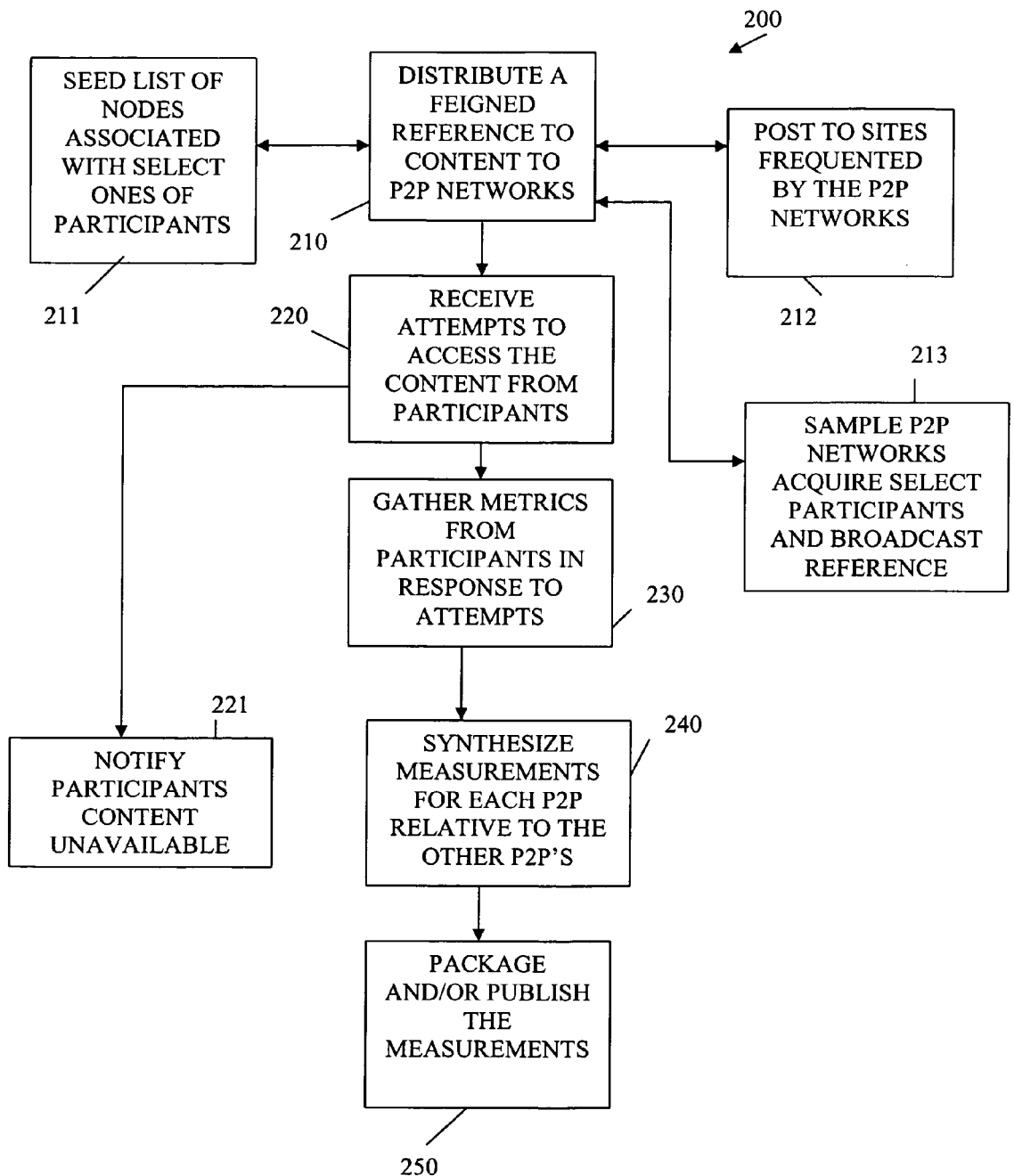
FIG. 2 is a diagram of a method for measuring P2P networks, according to an example embodiment.

FIG. 2 is a diagram of a method 200 for measuring P2P networks, according to an example embodiment. The method 200 (hereinafter "P2P measuring service") is implemented in a machine-accessible and readable medium and is accessible over a network. The network may be wired, wireless, or a combination of wired and wireless. The P2P measuring service implements, among other things, the components of the P2P network measuring system 100 of the FIG. 1.

The P2P measuring service may be implemented as instructions. The instructions when accessed by a machine perform the processing depicted in FIG. 2. Moreover, the instructions may be stored on removable media that when interfaced to a machine are uploaded to the machine and processed. In other cases, the instructions may be fabricated within memory or storage of one or more machines. Still further, the instructions may be downloaded from on machine and processed on another machine. It is also noted that some portions of the instructions may process in duplicate on a variety of different machines dispersed over a network. Thus, the instructions may be considered distributed and threaded in the sense that some portions of the instructions may process in parallel on different machines and at the same time.

At 210, the P2P measuring service distributes a feigned reference to content to a plurality of P2P networks. The content may be selected based on surveys or analysis to determine content this is generally viewed as universally popular across a plurality of P2P networks and across participants within any given P2P network. This provides a good statistical evaluation for the analysis of the P2P measuring service.

According to an embodiment, at 211, the distribution may occur by seeding a list of nodes associated with select participants of the P2P networks. That is, a given or known set of P2P participants may be further reduced and a sample set of the participants obtained, this sample set is then provided the feigned reference to the content. The idea is that the sample set provides a good representation of the known P2P networks and thus the nodes or participants associated with the sample set may be used to perform the analysis of the P2P measuring service.

In another embodiment, at 212, the P2P measuring service may distribute the feigned reference to the content by posting the reference on sites or bulletin boards, which are regularly frequented by the participants of those P2P networks. In this manner, the distribution may occur on the assumption that a good sample of participants will visit the site and attempt to access or download the feigned content.

In yet another embodiment, at 213, the P2P measuring service may obtain and use a known list of selective participants for P2P networks and may use that known list to distribute the feigned content reference. This may be done by sampling or monitoring P2P networks and their sites and gathering a list of participants (users) of those networks. The feigned reference may then be sent to the known list of participants.

It is to be understood that other techniques may be used to determine participants that are to receive the feigned content reference. Each such technique that permits the feigned content reference to be adequately distributed to some significant sample of participants of P2P networks are intended to be included with the teachings presented herein.

At 220, the P2P measuring service receives access attempts to access the content from the participants of the P2P networks. That is, the participants that received the feigned reference attempt to actually activate the reference and download the spoofed content. At 221, the participants are notified that the content is unavailable. This may occur in a variety of manners. For example, a message may indicate that the service for downloading is busy or that the content is unavailable. The message sent to the participants may also vary so as to not raise the suspicion of the participants. Moreover, the feigned references may not all point to a same download site and may be varied so as to not raise the suspicion of the participants.

At 230, the P2P measuring service gathers metrics from the participants in response to their attempts to download the spoofed content. Examples of metrics were supplied above with the discussion of the P2P network measuring system 100 of the FIG. 1. Again, some of these metrics may include date and time information, identity of the participant, identity of the P2P network, identity of the content associated with the feigned reference, bandwidth connection of participant, environmental configuration of the participant, and others.

At 240, the P2P measuring service synthesizes measurements for each P2P network in response to the metrics. The measurements are relative that is if there are only two P2P networks being compared, such as A and B, then measurements may indicate such things as A is bigger than B, B has more broadband connections for its participants, B is more interested in music, and the like. Examples of measurements or conclusions that may be drawn in response to the metrics were presented above with the measuring service 103 of the P2P network measuring system 100 of the FIG. 1.

According to an embodiment, at 250, the P2P measuring service can subsequently custom package and/or publish the measurements. That is, the P2P measuring service may sell or distribute custom reports to select content owners or advertisers. The information may even be used to publish a rating or profile for a P2P network. So, a P2P network may be profiled and rated and the information published and sold to subscribers. The P2P measuring service may also alert subscribers when certain thresholds or measurements are obtained.

The P2P measuring service permits more reliable conclusions and quality metrics to be derived for P2P networks. This information may prove to be invaluable to content owners and advertisers. It may also be valuable to the P2P networks to improve their services.

Figure 3:
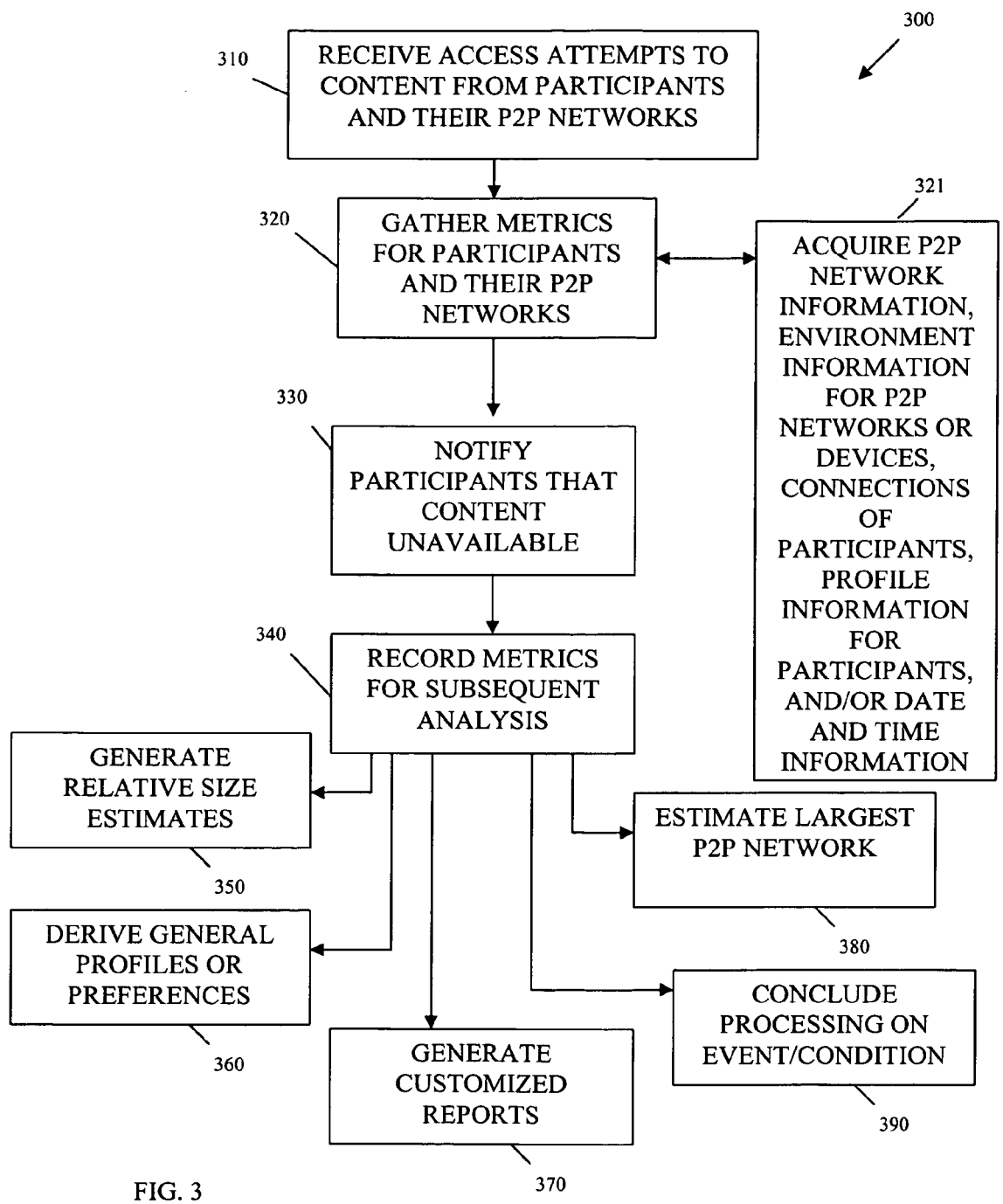
FIG. 3 is a diagram of method for gathering metrics for P2P networks, according to an example embodiment.

FIG. 3 is a diagram of method 300 for gathering metrics for P2P networks, according to an example embodiment. The method 300 (hereinafter "P2P metric service") is implemented in a machine-accessible and readable medium and is operational over a network. The network may be wired, wireless, or a combination of wired and wireless.

The P2P metric service represents alternative processing to the method 200 of the FIG. 2. That is, the processing of the P2P metric service may be viewed as the some aspects of the P2P uploader 102 and the measuring service 103 of the P2P network measuring system 100 of the FIG. 1. The method 200 and other aspects of the P2P network measuring system 100, such as the P2P flooder 101 were described with the processing of the method 200 of the FIG. 2.

Again, similar to the method 200. The P2P metric service may be implemented as instructions. The instructions can reside on removable media, on network storage devices and downloaded, or fabricated within memory or storage of machines.

At 310, the P2P metric service receives access attempts from participants of P2P networks that are attempting to access content, which the participants believe to be available for download but which is actually spoofed for purposes of gathering metrics about the participants and their P2P networks.

Once the P2P metric service has received a request to download the spoofed content, at 320, the P2P metric service is in position to acquire metrics from the requesting participants.

According to an embodiment, at 321, a variety of metrics may be gathered. These metrics may include information about the P2P network to which the requesting participant is associated, information about the participant, information about broadband connections for the participant, data and time information that the access attempt was received, and the like. In fact, the metrics may be used to develop a profile or preference for the participant and for the P2P network (when combined with other access requests for the same content from other participants of the P2P network).

At 330, the P2P metric service notifies the requesting participants that the content is unavailable. That is, the content was never really accessible and the participants are notified in such a manner that they do not realize this fact; the participants believe that some other problem has occurred, which prevents the participants from immediately downloading the content. The notification message maybe varied to continue to perpetuate the ruse for other spoofed content associated with additional iterations of the P2P metric service.

At 340, the P2P metric service records the metrics acquired, at 330, for subsequent analysis and/or mining activities. Some analysis or mining activities are also depicted in the FIG. 3. These examples are not intended to be exhaustive as other activities may exist and are intended to fall within the scope of the teachings presented herein.

According, at 350, and as one example, the P2P metric service may elect to use the recorded metrics to generate a relative size determination for each of the P2P networks relative to the other remaining P2P networks. In another example, at 360, the P2P metric service may derive relative and general profiles and preferences with respect to each of the P2P networks and their corresponding participants. At 370, customized reports may also be generated for targeted content owners, associations of content owners, advertisers, and the like. Still further, at 380, the relative sizes of the P2P networks determined at 350 may also be used to estimate a largest P2P network selected from the pool of evaluated P2P networks.

In an embodiment, at 390, the processing of the P2P metric service may conclude after some predefined event or condition is determined. For example, the P2P metric service may process for N number of days or until a certain percentage of access attempts are received relative to the number of spoofed content references that was initially flooded on the P2P networks.

It should also be noted that the response rate and metrics may be used to improve the flooding mechanism that was discussed in detail with the method 200 and the P2P network measuring system 100 of the FIGS. 2 and 1, respectively.

It is now understood how a more intelligent and statistical approach may be used to gather quality information and metrics about P2P networks. Conclusions or measurements drawn from these metrics may be used for a variety of useful purposes, such as feeding content owners, feeding content associations, publishing ratings, publishing profiles, publishing preferences, and the like. The content owners, associations, advertisers, and even the P2P networks themselves may subsequently consume the measurements to improve their operations with respect to the P2P networks.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A system comprising:
   a machine including a processor and a memory;
   the machine configured with a Peer-To-Peer (P2P) flooder stored in the memory and executed on the processor; the P2P flooder distributes links, the links pretend to be associated with content over a plurality of P2P networks, but the links are actually to the P2P uploader and the links are not for the content that the links pretend to be associated with, the links are also accompanied with advertisements to entice specific participants to activate the links,
   the machine also configured with a P2P uploader stored in the memory and executed on the processor; the P2P uploader records metrics from the specific participants of the P2P networks when the participants attempt to acquire the content by accessing the links, the links point to the P2P uploader, the metrics include: identities for the participants, bandwidth connections for each attempt to acquire the content, a particular P2P network from which a particular attempt to acquire the content is coming from, a date and time of a particular attempt to acquire the content, a name for the content that is being feigned, and an identity for the P2P flooder; and
   the machine also configured with a measuring service stored in the memory and executed on the processor, the measuring service evaluates the metrics to develop measurements with respect to the P2P networks relative to one another, the metrics are also evaluated to develop profiles and ratings for each of the P2P networks, networks and for a type of content emerging as a preference in each of the P2P networks, and for specific P2P participants.

2. The system of claim 1, wherein the P2P uploader responds to each participant that activates one of the links with a message indicating that the content is unavailable.

3. The system of claim 1, wherein the P2P flooder broadcasts the links over at least one of the P2P networks, posts the links on bulletin boards or sites associates with the P2P networks, and seeds the links to selective participants over the P2P networks.

4. The system of claim 1, wherein the metrics further include at least one or more of: an estimated geographical location for each of the participants, versions of the P2P networks used by the participants and machine or environmental profiles associated with the participants.

5. The system of claim 1, wherein the P2P flooder varies locations associated with the links, which point to instances of the P2P uploader, in order to prevent the identity of the P2P uploader from being detected by the participants.

6. The system of claim 1, wherein the measurements produced by the measuring service estimate a size for each of the P2P networks relative to the other remaining P2P networks.

7. The system of claim 1, wherein the measurements produced by the measuring service estimate a profile or a preference for each of the P2P networks relative to the other remaining P2P networks.

8. A non-transitory machine accessible medium having instructions thereon, the instructions executed by a processor to perform a method of:
   distributing, by the processor, a feigned reference to content on a plurality of Peer-To-Peer (P2P) networks, the feigned reference pretends to be associated with the content but is actually a link to a P2P uploader, and the feigned reference is also accompanied with an advertisement to further entice participants to activate the feigned reference;
   receiving, by the processor, attempts to access the content from the participants of the plurality of P2P networks;
   gathering, by the processor, metrics from the participants and the P2P networks in response to the attempts;
   identifying, by the processor, the metrics as identities for the participants attempting to access the content, identities of the P2P networks, an identity for the content, bandwidth connections for the participants, and environmental configurations for the participants;
   using the metrics to develop profiles and ratings for each of the P2P networks, for a type of content emerging as a preference within each of the P2P networks and for specific P2P participants; and
   synthesizing, by the processor, measurements for each of the P2P networks relative to remaining ones of the P2P networks in response to the metrics.

9. The method of claim 8 further including instructions for notifying, by the processor, the participants that the content is unavailable in response to the attempts.

10. The method of claim 8, wherein distributing further includes seeding, by the processor, a list of nodes associated with select ones of the participants with the feigned reference to the content.

11. The method of claim 8, wherein distributing further includes posting the feigned reference to the content to sites frequented by the P2P networks.

12. The method of claim 8, wherein distributing further includes sampling each of the P2P networks and acquiring select ones of the participants and broadcasting the feigned reference to the content to the select ones of the participants.

13. The method of claim 8 further including, packaging and publishing, by the processor, the measurements.

14. A machine-implemented method to execute on a processor, including:

receiving, by the processor, access attempts to content from participants of Peer-To-Peer (P2P) networks, the access attempts are made by the participants via the P2P networks for the content but the content does not exist and is feigned, the access attempts are links to a P2P uploader and the links are accompanied with advertisements to further entice the participants to activate the links;

gathering, by the processor, metrics for the participants and their corresponding P2P networks;

identifying, by the processor, the metrics are information for: the participants, broadband connections for the participants, and date and time that an access attempt was received;

notifying, by the processor, the participants that requests for the content cannot be satisfied;

recording, by the processor, the metrics for subsequent analysis; and using the metrics to develop profiles and ratings for each of the P2P networks, to develop a profile to a type of content emerging as a preference within each of the P2P networks, and for specific P2P participants.

15. The method of claim 14 further including, generating, by the processor, a relative size estimate for each of the P2P networks relative to other remaining ones of the P2P networks from the metrics.

16. The method of claim 14 further including, deriving, by the processor, a general environmental profile or a general content preference profile for each of the P2P networks relative to the other remaining ones of the P2P networks from the metrics.

17. The method of claim 14, wherein gathering further includes acquiring at least one of: P2P network information, environment information for the P2P networks, and environmental information for devices and connections of the participants.

18. The method of claim 14 further including, generating, by the processor, one or more customized reports in response to the metrics.

19. The method of claim 14 further including, estimating, by the processor, a largest P2P network from the P2P networks in response to the metrics.

20. The method of claim 14 further including, concluding, by the processor, the processing of the method after at least one of a predetermined event is detected, a predefined amount of elapsed time expires, and a predefined calendar date is reached.

* * * * *